United States Patent [19]
Havens et al.

[11] Patent Number: 5,291,008
[45] Date of Patent: Mar. 1, 1994

[54] OPTICAL ASSEMBLY AND APPARATUS EMPLOYING SAME USING AN ASPHERICAL LENS AND AN APERTURE STOP

[75] Inventors: William H. Havens, Skaneateles, N.Y.; Harry R. McKinley, Southamptom, Mass.; Charles M. Hammond, Jr., Skaneateles, N.Y.; Joseph J. Morabito, Auburn, N.Y.; Jeffrey B. Powers, Syracuse, N.Y.

[73] Assignee: Welch Allyn, Inc., Skaneateles Falls, N.Y.

[21] Appl. No.: 819,480

[22] Filed: Jan. 10, 1992

[51] Int. Cl.$^5$ ............................................. G06K 7/10
[52] U.S. Cl. ................... 235/462; 235/472; 235/454; 359/739
[58] Field of Search ............... 235/467, 462, 472, 455, 235/454; 250/566; 359/738, 739

[56] References Cited

U.S. PATENT DOCUMENTS

| | | | |
|---|---|---|---|
| 4,143,809 | 3/1979 | Uebbing et al. | 235/462 |
| 4,613,759 | 7/1986 | Frohbach | 250/566 |
| 5,010,241 | 4/1991 | Butterworth | 235/462 |
| 5,164,573 | 11/1992 | Ishikawa | 235/462 |

FOREIGN PATENT DOCUMENTS

| | | | |
|---|---|---|---|
| 0188675 | 8/1986 | Japan | 235/462 |
| 0012384 | 1/1989 | Japan | 235/462 |
| 3262084 | 11/1991 | Japan | 235/462 |

*Primary Examiner*—Donald Hajec
*Assistant Examiner*—Esther Chin
*Attorney, Agent, or Firm*—Harris Beach & Wilcox

[57] ABSTRACT

There is disclosed an simplified apparatus that enables optical scanners to achieve minimum field curvature and at the same time provide uniformly distributed light on an image sensor. A single element lens, preferably an aspherical lens made of a plastic material is combined with an aperture stop. The combination is capable of reducing lens aberrations and minimizing image field curvature for an object plane that contains indicia to be scanned or read. A suitably demagnified image of the indicia is focused onto an image sensor such as a CCD array. The spatial light distribution function in the image plane can be equalized by an attenuator, such as a neutral density filter or a slit, suitably configured to compensate for the reduced optical efficiency at large field angles. An aspherical lens containing a dye or a cold mirror can be used for limiting light transmission to a range of wavelengths.

33 Claims, 2 Drawing Sheets

OPTICAL ASSEMBLY AND APPARATUS EMPLOYING SAME USING AN ASPHERICAL LENS AND AN APERTURE STOP

BACKGROUND OF THE INVENTION

This invention relates to an optical assembly that employs a single element lens to view an indicia target with an image sensor. More particularly it relates to an optical assembly in a scanning instrument that minimizes field curvature of indicia being read with a single element lens, and projects an image of the indicia onto an image sensor.

Most modern optical scanners and bar code readers employ optical systems to direct reflected light from the indicia being read to an image sensor. Today multi-element CCD arrays are commonly used as the image sensor, and, with such array, a bar code symbol can be read while maintaining the reader in a stationary position, or by moving the reader with respect to the indicia.

In such scanners it is desirable that the operational depth of field be maximized while giving appropriate attention to the optical efficiency of the lens imaging system. In an optical system attention should be given to many of the following issues: optical efficiency; well known lens faults such as spherical and chromatic aberration; minimization of image field curvature, such that a relatively wide symbol can be adequately viewed; and the well known cosine to the fourth power illumination falloff phenomenon. Dealing with these issues under the constraints of adequate depth of field and maintaining economy in materials and manufacturing imposes severe burdens on those striving to advance the bar code reading art.

In the prior art, correction of lens aberrations has been achieved by multi element lens systems. Representative of this approach is U.S. Pat. No. 4,766,300 to Chadima, Jr. et al, in which a bar code reader optical assembly employs five lenses constructed of polystyrene and acrylic lens material. This system further employs mirrors to establish a long, filed optical path in order to achieve suitable depth of field and image resolution for a bar code application.

In such systems, the optics are mechanically complex and expensive to fabricate and cling.

SUMMARY OF THE INVENTION

It is therefore a primary object of the present invention to provide an improved, economical optical assembly that achieves a minimum image field curvature over the indicia being scanned.

It is another object o the present invention to provide an optical assembly that provides uniformly distrusted light on an image sensor.

It is yet another object of the present invention to reduce the complexity of optical systems in optical scanners and bar code readers.

It is a further object of the present invention to enable optical scanners and bar code readers to operate with a maximum optical efficiency for a given operational depth of field.

These and other objects of the present invention are attained by an assembly that can be adapted to small, portable scanning instruments such as bar code readers. A single element lens, preferably an aspherical lens made of a plastic material is combined with an aperture stop. The combination is capable of reducing lens aberrations and minimizing image field curvature for an object plane that contains indicia to be scanned or read. A suitably demagnified image of the indicia is focused onto an image sensor such as a CCD array. The spatial light distribution function in the image plane can be equalized by an attenuator, such as a neutral density filter of a slit, suitably configured to compensate for the reduced optical efficiency at large field angles.

In another aspect of the invention, the lens may be impregnated with colored dye, or filers otherwise interposed in the optical path, so that unwanted light wavelengths are rejected.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
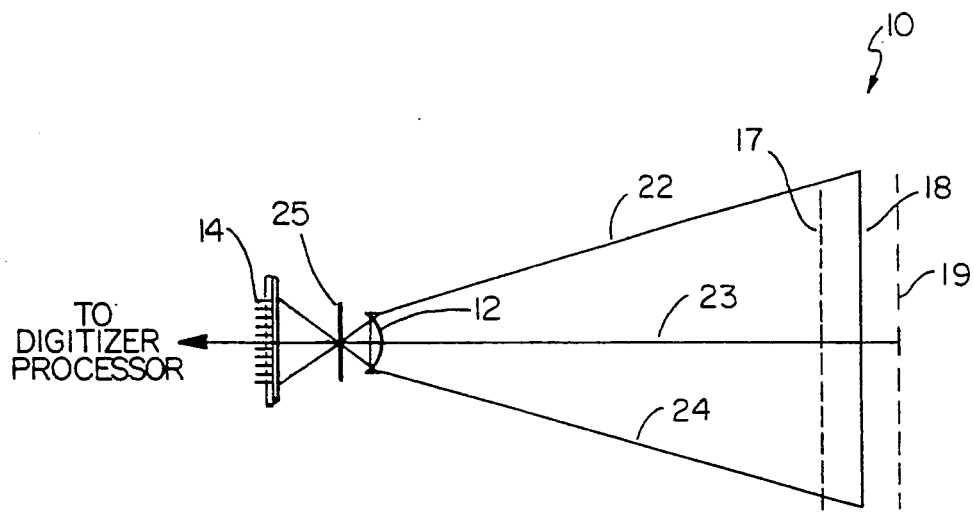
FIG. 1 is a partially schematic plan view of an embodiment of the invention.
Figure 2:
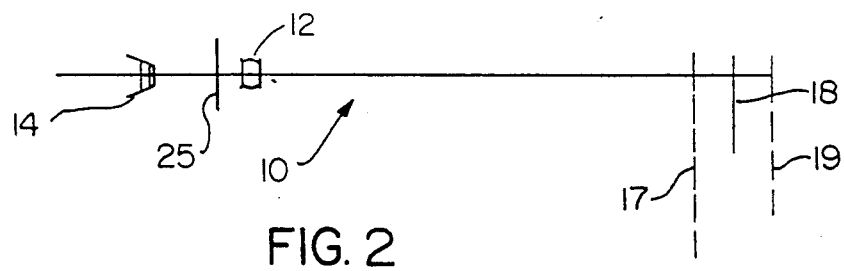
FIG. 2 is a partially schematic side elevation of the embodiment of FIG. 1.

Turning now to the drawings, there is shown in FIGS. 1 and 2 generally at 10 an optical assembly that is an embodiment of the invention. The invention is preferably used as a part of a CCD bar code scanner that includes conventional digitizing circuitry, producing a signal that can be displayed or further processed. It is enclosed in a housing (not shown), and the CCD output is coupled to the bar code scanner signal processing circuitry.

A target 18, having indicia, such as a bar code symbol, is disposed in a region of space, limited by lines 17, 19, that corresponds to the working depth of field of a bar code scanner. Light energy that is incipient of the target and then reflected is exemplified by rays 22, 23, 24. Ray 23 is aligned with the optical axis.

A single element landscape lens 12, disposed between image sensor 14, and target 18 accepts the reflected light rays 22, 23, 24, and forms an image of target 18 on image sensor 14. The lens is preferably composed of methyl methacrylate, available form Rohm and Haas under the designation V825-366; however glass or many other optical plastic materials are suitable. It is an important aspect of the invention that lens 12 have minimum image field curvature, so that all regions of target 18 are in focus on the image sensor. Minimum image field curvature can be achieved using well known lens design techniques, and need not be further discussed herein. Lens 12 is typically a single element, aspherical converging lens, and has a magnification of about 2.73 at the center of the depth of field. Magnifications in the range of 2.05-3.70 have been found suitable in various applications. In the preferred embodiment image sensor 14, lens 12, and target 18 are disposed such that the region of sensitivity corresponding to a pixel of image sensor 14 is approximately 0.038×0.038 mm in the plane of the bar code symbol. The lens is configured such that the total field width in the mid-plane of the working depth of field is 78.23 mm.

Many variants in lens construction are possible. In some applications it may be desirable to include a photochromic material in the lens, or operatively associate the lens with the photochromic material so that the optical transmissivity varies in accordance with the intensity of light passing therethrough. This may prevent saturation or overdriving of the image sensor 14 under conditions of high light intensity. In other applications the lens can be impregnated with colored substances such as dyes, so that its optical transmissivity is limited to a desired range of light wavelengths. In other applications an optical filter may be included so that the system optical transmissivity is restricted to a desired range of light wavelengths. Those skilled in the art will appreciate that optical fibers, Fresnel type lenses, and even holographic imaging devices can e substituted for the single element lens described above, with appropriate field correction.

In the preferred embodiment sensor 14 is a conventional multi element CCD array. Line CCDs having 1×2040 elements measuring approximately 12×12 microns are suitable. It is possible to use other kinds of image sensors, such as array CCDs, light sensitive film, or an orthocon imaging device. While image sensor 14 as shown is integral with the lens system, it is possible to focus an image of the target on an optical interface, such as a fiber optic bundle, which is coupled to a remote sensor.

Stop 25 is provided between lens 12 and image sensor 14 in order to reduce lens aberrations to an acceptable level. The stop might also be located between lens 12 and target 18. Using modern lens design programs that are known to the art, it is possible to tailor the size and position of stop 25, as well as the lens parameters, in order to obtain uniform sharpness over the entire field of view and depth of field.

It can be appreciated from inspection of FIG. 1 that light 24 originating from the bottom portion of the target 18 and reaching the top portion of the image sensor 14 is constrained to the bottom portion of lens 12. A similar constraint applies to the light 22, originating from a different part of the target. Different regions of the lens are utilized for transmitting the beams 22, 24 therethrough.

In the preferred embodiment, the following physical dimensions have been found to be satisfactory: lens 12 has the characteristics as shown in Tables 1 and 2.

TABLE 1

| Surface | Radius of Curvature | Center Thickness |
|---|---|---|
| A | 76.200 mm. Concave | 4.166 mm. |
| B | 12.060 mm. Convex | |

Surface B is aspheric, with a conic constant of −0.370, utilizing standard aspheric equations known to the optical art.

TABLE 2

| Radius (mm) | Sag (mm) |
|---|---|
| 0.0 | 0.0 |
| 0.5 | 0.1037 |
| 1.0 | 0.04150 |
| 1.5 | 0.09351 |
| 2.0 | 0.16656 |
| 2.5 | 0.26090 |
| 3.0 | 0.37684 |
| 3.5 | 0.51480 |

TABLE 2-continued

| Radius (mm) | Sag (mm) |
|---|---|
| 4.0 | 0.67526 |
| 4.5 | 0.85822 |
| 5.0 | 1.06618 |
| 5.5 | 1.29816 |
| 6.0 | 1.55576 |
| 6.5 | 1.84010 |
| 7.0 | 2.15253 |
| 7.5 | 2.49464 |
| 8.0 | 2.86829 |
| 8.5 | 3.27571 |

The stop 25 is positioned 10.00 mm in front of image sensor 14, and has an aperture of 2.22 mm. Lens 12 is disposed 25.25 mm in front of image senor 14, and the distance between target 18 and image sensor 14 is 151.7 m. The resulting depth of field for scanning bar code symbol elements having a minimum lateral dimension of 0.127 mm is 12.7 mm. over a field width of 74.9 mm. Other sizings of the optical elements can be used, depending upon system needs.

Figure 3:
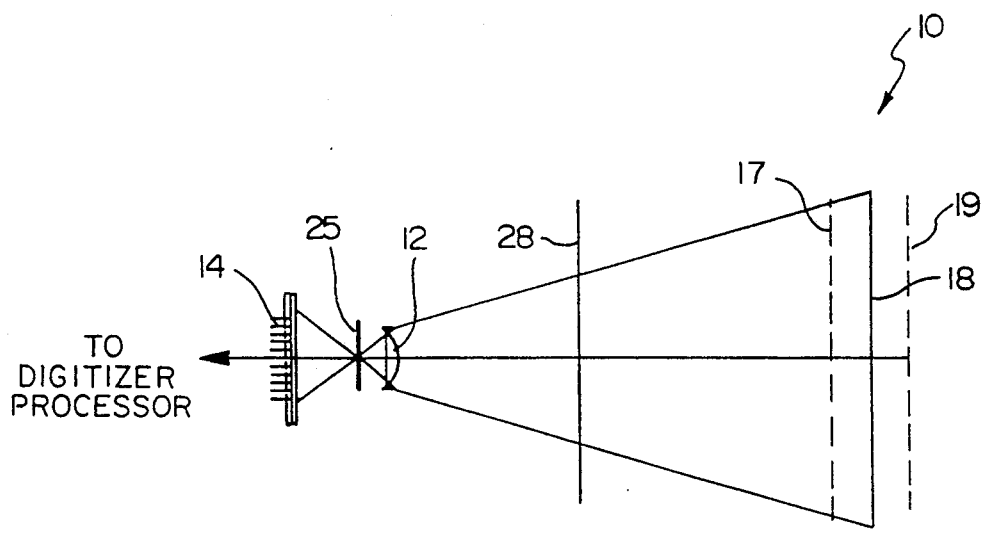
FIG. 3 is a partially schematic plan view of a first alternate embodiment of the invention.

Referring now to FIG. 3, there is shown a first alternate embodiment of the invention, in which a cold mirror 28 is interposed in the light path intermediate lens 12 and target 18. This mirror acts as a filter that reflects light of a desired subrange of wavelengths and transmits unwanted light. The provision of mirror 28 is useful for operation when ambient light level is high. Other kinds of light filers can be substituted for mirror 28 in order to limit the spectral width of light that received by light sensor 14.

Figure 4:
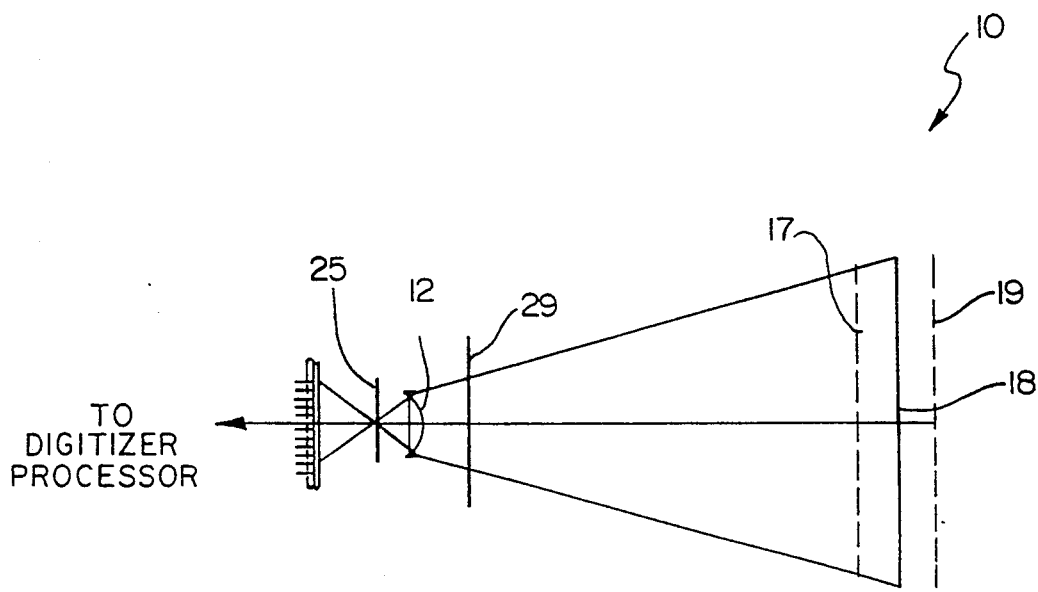
FIG. 4 is a partially schematic plan view of a second alternate embodiment of the invention.
Figure 5:
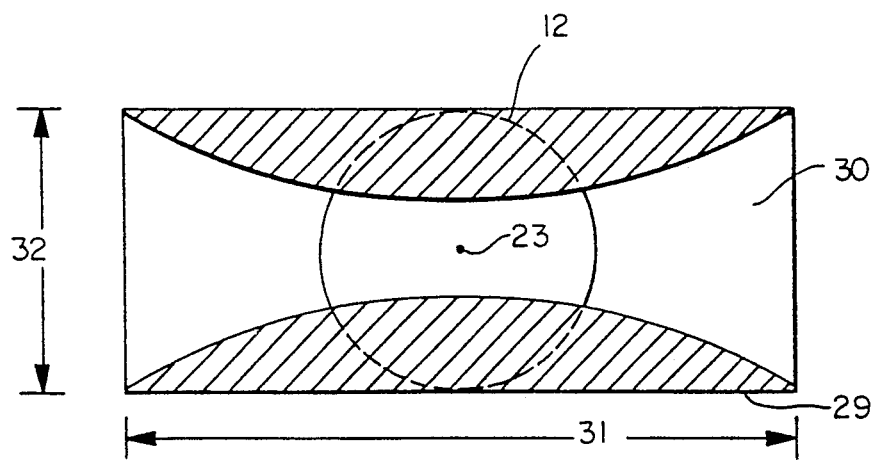
FIG. 5 is a cutaway frontal view of a portion of the embodiment of FIG. 4.

In FIGS. 4 and 5 there is depicted a second alternate embodiment of the invention. Light attenuator 29 is disposed in the optical axis intermediate lens 12 and target 18. The purpose of attenuator 29 is to equalize the amount of light energy being reflected onto image sensor 14 from target 18 through lens 12. In the preferred embodiment attenuator 29 has a longitudinal dimension 31 and a cross-longitudinal dimension 32. A slit formed therein lies in a plane that is substantially orthogonal to the optical axis 23. To compensate for fall-off of light intensity at larger field angles, the cross-longitudinal dimension of the slit varies along the a longitudinal dimension, and increases from the optical axis in a radial direction. The slit may be configured to compensate for the consine to the fourth power falloff effect referenced above, or for other predicted or measured reductions in angular light intensity.

The attenuator can also be a neutral density filter that is disposed in the optical path, preferably in a plane that is orthogonal to the optical axis, and which has a graded transmissivity that increases from the optical axis in a radial direction. The transmissivity gradient can be tailored to compensate for measured or predicted falloff in angular light intensity.

While this invention has been explained with reference to the structure disclosed herein, it is not confined to the details set forth and this application is intended to cover any modifications and changes as may come within the scope of the following claims:

What is claimed is:

1. An optical apparatus, comprising:
   light sensing means for detecting indicia, said light sensing means having an active viewing surface;
   a single element field corrected lens means, disposed between said light sensing means and said indicia, having an optical axis and a radial dimension that is orthogonal with said optical axis; and an aperture stop means spaced apart form said lens means for constraining light beams originating from respective first and second regions of the indicia and reaching first and second regions of said active viewing surface to traverse first and second exclusive portions of said lens means;

whereby light beams originating from all points on said indicia focus onto said active viewing surface.

2. The apparatus of claim 1, wherein said aperture stop means is disposed between said light sensing means and said indicia.

3. The apparatus of claim 1, wherein said lens means is an aspherical lens.

4. The apparatus of claim 3, wherein said lens is constructed of plastic.

5. The apparatus of claim 1, wherein said lens means is operatively associated with a photochromic material, whereby said material has an optical transmissivity that varies in accordance with the intensity of light passing therethrough.

6. The apparatus of claim 1, further comprising optical filter means, disposed between said light sensing means and said indicia, for limiting light passing therethrough to a given range of wavelengths.

7. The apparatus of claim 1, wherein said lens means has an optical transmissivity that is limited to a given subrange of light wavelengths.

8. The apparatus of claim 7, wherein said lens means contains a colored dye.

9. The apparatus of claim 1, further comprising means of limiting the spectral width of light that is received by said light sensing means.

10. The apparatus of claim 9, wherein said means for limiting comprises mirror means for reflecting light that has a given subrange of wavelengths and for transmitting light that does not have said subrange of wavelengths.

11. The apparatus of claim 1, wherein said light sensing means comprises a CCD array.

12. The apparatus of claim 11, wherein said CCD array is one dimensional.

13. The apparatus of claim 1, further comprising attenuating means, disposed in said optical axis between said light sensing mans and said indicia, for equalizing the amount of light energy that is incident on said light sensing means form spatial regions of said indicia via said lens means.

14. The apparatus of claim 13, wherein said attenuating means has therein a slit having a longitudinal dimension and a cross-longitudinal dimension thereby defining a plane that is substantially orthogonal to said optical axis, said cross-longitudinal dimension of said slit varying along said longitudinal dimension and increasing from the optical axis in a radial direction.

15. The apparatus of claim 13, wherein said attenuating means comprises a neutral density filter having a transmissivity that increases from the optical axis in a radial direction.

16. The apparatus of claim 1, wherein said active viewing surface is planar.

17. A bar code scanner, comprising:
a housing;
light sensing means for detecting light reflected from a bar code symbol nd for generating an analog signal in response thereto that is indicative of the bar-space pattern of said bar code symbol, said light sensing means having an active viewing surface;

signal processing means, composed to said light sensing means, for processing said analog signal;

a single element field corrected lens, disposed between said light sensing means and said bar code symbol, having an optical axis and a radial dimension that is orthogonal with said optical axis; and an aperture stop means spaced apart from said lens for constraining light beams originating from respective first and second regions of the bar code symbol and reaching first and second regions of said active viewing surface to traverse first and second exclusive portions of said lens;

whereby light rays originating from all points on said bar code symbol focus onto said active viewing surface.

18. The apparatus of claim 17, wherein said signal processing means comprises digitizing means for converting said analog signal to a digital signal.

19. The apparatus of claim 17, wherein said aperture stop mean is disposed between said light sensing means and said bar code symbol.

20. The apparatus of claim 17, wherein said lens is aspherical.

21. The apparatus of claim 17, wherein said lens is constructed of plastic.

22. The apparatus of claim 17, wherein said lens is operatively associated with a photochromic material, whereby said material has an optical transmissivity that varies in accordance with the intensity of light passing therethrough.

23. The apparatus of claim 17, further comprising optical filter means, disposed between said light sensing means and said bar code symbol, for limiting light passing therethrough to a given range of wavelengths.

24. The apparatus of claim 17, wherein said lens has an optical transmissivity that is limited to a given subrange of light wavelengths.

25. The apparatus of claim 24, wherein said lens contains a dye.

26. The apparatus of claim 17, further comprising means for limiting the spectral width of light that is received by said light sensing means.

27. The apparatus of claim 26, wherein said means for limiting comprises a mirror means for reflecting light that has a given subrange of wavelengths and for transmitting light that does not have said subrange of wavelengths.

28. The apparatus of claim 17, wherein said light sensing means comprises a CCD array.

29. The apparatus of claim 28, wherein said CCD array is one dimensional.

30. The apparatus of claim 17, further comprising attenuating means, disposed in said optical axis between said light sensing means and said bars code symbol, for equalizing the amount of light energy that is incident on said light sensing means from spatial regions of said bar code symbol via said lens.

31. The apparatus of claim 30, wherein said attenuating means has therein a slit having a longitudinal dimension and a cross-longitudinal dimension thereby defining a plane that is substantially orthogonal to said optical axis, said cross-longitudinal dimension of aid slit varying along said longitudinal dimension and increasing from the optical axis in a radial direction.

32. The apparatus of claim 30, wherein said attenuating means comprises a neutral density filer having a transmissivity that increases from the optical axis in a radial direction.

33. The apparatus of claim 17, wherein said active viewing surface is planar.

* * * * *